United States Patent [19]
Teich

[11] Patent Number: 5,878,623
[45] Date of Patent: Mar. 9, 1999

[54] CONTROL MECHANISM FOR A GEARBOX

[75] Inventor: Michael Teich, Mannheim, Germany

[73] Assignee: Deere & Company, Moline, Ill.

[21] Appl. No.: 924,767

[22] Filed: Aug. 27, 1997

[30] Foreign Application Priority Data

Dec. 21, 1996 [DE] Germany ................... 196 53 852.1

[51] Int. Cl.⁶ ............................ B60K 20/00; F16H 21/44
[52] U.S. Cl. ..................... 74/473.3; 74/473.21; 74/100.1
[58] Field of Search ................................ 74/473.3, 100.1, 74/47.1, 473.21

[56] References Cited

U.S. PATENT DOCUMENTS

| | | | |
|---|---|---|---|
| 4,850,238 | 7/1989 | Inoue | 74/473.3 X |
| 4,879,922 | 11/1989 | Suzuki | 74/473.15 X |
| 5,156,061 | 10/1992 | Ishizuki | 74/473.3 |
| 5,187,998 | 2/1993 | Asano et al. | 74/97.1 X |
| 5,400,673 | 3/1995 | Brock | 74/473.3 |
| 5,429,037 | 7/1995 | Weber et al. | 74/471 XY |

FOREIGN PATENT DOCUMENTS 737 826 A1  10/1996  European Pat. Off. .

*Primary Examiner*—Charles A. Marmor
*Assistant Examiner*—Marcus Charles

[57] ABSTRACT

A control mechanism is coupled to a gearshift lever which is adapted to control a reversing gearbox having neutral, forward and reverse operational modes. The control mechanism includes a pivot lever which is connected to the gearshift lever and which is pivoted about a first stationary axis, a reset lever which is pivoted about a second stationary axis, a resetting element which is connected to the reset lever and a spring which urges the reset lever into a neutral position. The pivot and reset levers are slidably and rotatably coupled to each other so that a buckling of the pivot and reset levers from their neutral position against the force of the spring is possible. A detent mechanism permits the levers to remain in their buckled position against the bias of the spring.

12 Claims, 4 Drawing Sheets

CONTROL MECHANISM FOR A GEARBOX

BACKGROUND OF THE INVENTION

The invention relates to a control mechanism for a vehicle transmission gearbox which can be shifted between a neutral position and non-neutral positions.

In gearboxes which are mechanically shifted by a shift lever between a neutral position and gear ratio position or between differing gear ratios, the correct position of the lever is not always reached. Instead, the lever may be placed in an intermediate position associated with neither the neutral position nor a specific gear ratio of the gearbox. It is desirable to provide a control mechanism which assures that the lever will not be left in an intermediate position, and that the lever will be in a desired particular position, even though no detent positions are provided on the gearshift lever.

The lever may be left in an intermediate position as a result of insufficient forces being applied to the lever. Or, this may be the result of excessively large tolerances in the linkages between shift lever and gearbox, or may be the result of wear. The requirements of tight tolerances and durability, however, increase the technical expense and the costs of the transmission elements. If push-pull control cables are applied between the shift lever and the gearbox, added difficulties are presented by play that varies with load, friction, corrosion, erroneous adjustments and tight routing radii of the control cable.

In EP-A-0 737 826 a gearshift lever is connected to a gearbox through a flexible cable. The gearshift lever can be pivoted about two axes that are perpendicular to each other. In order to retain the gearshift lever reliably with respect to a direction of pivoting in a desired central neutral position or in a deflected position in which a gear ratio is engaged, the direction of pivoting is controlled by a helical spring. The core of the helical spring is supported on a pin. The legs of the helical spring that extend outward engage an elongated hole in a pivoted lever that is fastened to the gearshift lever and force the latter into a central position which corresponds to the neutral position. The elongated hole contains detent positions that are intended to retain the gearshift lever in a gear ratio engagement position.

SUMMARY OF THE INVENTION

Accordingly, an object of this invention is to provide a control mechanism for a lever-controlled gearbox which assures that the lever will not be left in an intermediate position, and that the lever will be in a desired particular position.

A further object of the invention is to provide such a mechanism wherein the lever is reset into its neutral position if it has not been moved entirely into a non-neutral position.

Another object of the invention is to provide such a mechanism which does not require tight manufacturing tolerances, which is able to withstand wear, which is simple to manufacture and which has a low cost.

Another object of the invention is to provide such a mechanism which utilizes push-pull control cables.

These and other objects are achieved by the present invention, wherein a gearshift lever shifts a vehicle gearbox between a neutral position and gear positions. A first lever is coupled to the gearshift lever and is pivotable about a first stationary axis. A second lever is pivotable about a second stationary axis which is parallel to the first axis. A resetting element is coupled to the second lever. A spring element is biased to urge the second lever into a position which corresponds to the neutral position of the gearshift lever. The first and second levers are pivotally and slidably coupled to each other, so that they may move out of their neutral positions against the bias of the spring element. A detent means holds the levers in their non-neutral positions against the bias of the spring element. The first and second levers are connected to each other by a joint which permits relative sliding and rotation therebetween, so that the levers can buckle from their neutral position against the force of the spring element.

DETAILED DESCRIPTION

Figure 1:
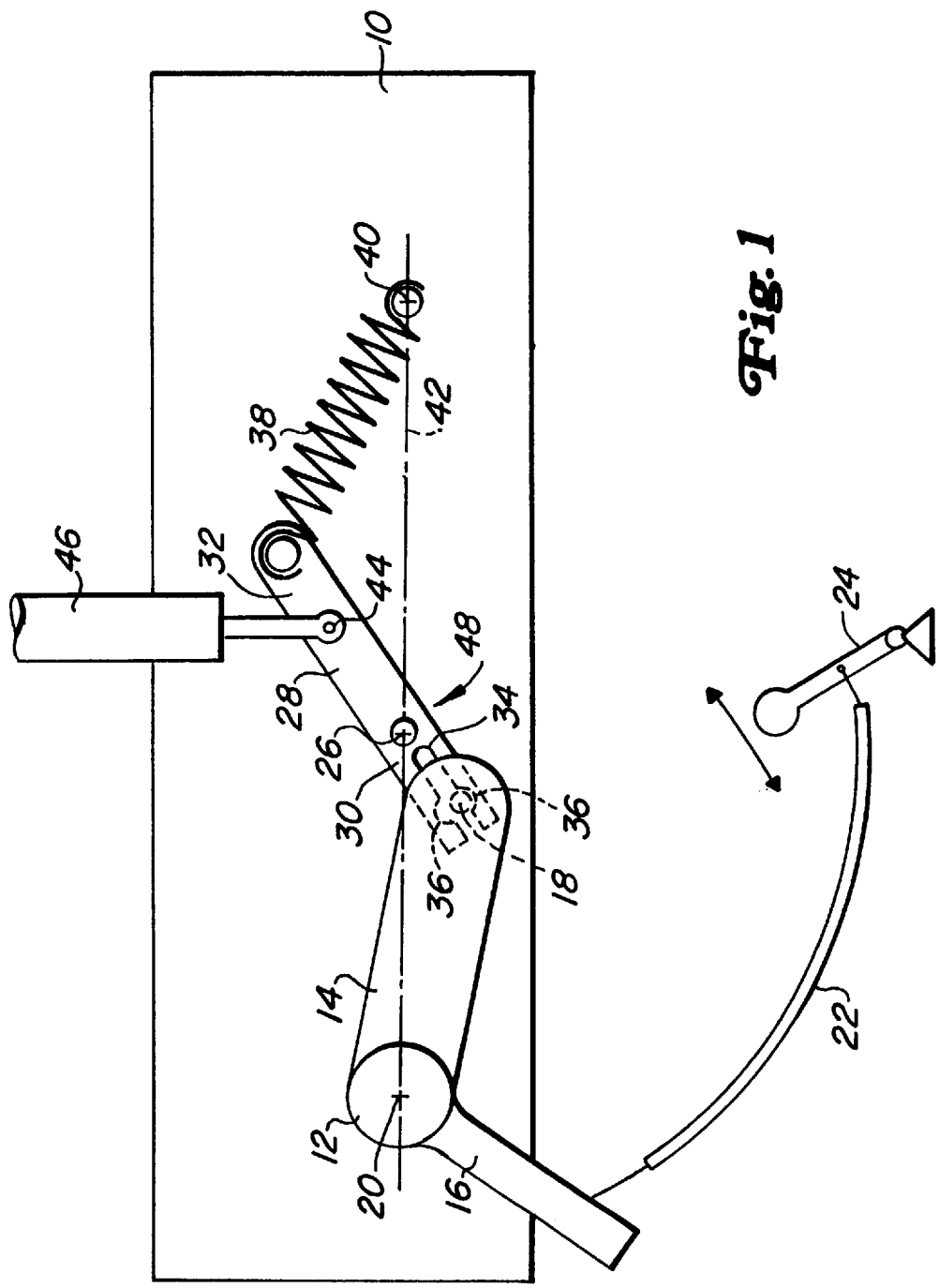
FIG. 1 is a schematic view of a control mechanism according to the invention in a non-neutral position.

FIG. 1 shows a first embodiment of a control mechanism installed on a base plate 10. The base plate 10 rotatably supports a shaft 12 by bearings. The shaft 12 is non-rotatably coupled to a pivot lever 14 and a second lever 16. The pivot lever 14 has a free end which carries a pin 18 which extends parallel to the shaft 12. The shaft 12 defines a first stationary axis 20. The second lever 16 engages the end of a push-pull control cable 22, whose other end is connected to a manually operated pivotable gearshift lever 24. The gearshift lever 24 controls the status of a known gearbox (not shown), and is preferably a reversing shift lever by which the gearbox can be shifted from a forward gear through a neutral position into a reverse gear. If the gearshift lever 24 is pivoted in the direction of the arrow, then the push-pull control cable 22 transmits the pivoting motion to the pivot lever 14, the second lever 16 and the shaft 12.

A reset lever 28 is supported in bearings on the base plate 10, for rotation about a second stationary axis 26 that extends parallel to the first axis 20. The reset lever 28 is provided with a leg 30, 32 to each side of the second axis 26. A longitudinal slot 34 is provided in the leg 30 which is open towards the end of the leg and extends in the longitudinal direction of the lever. A bay-shaped recess 36 is formed in the sides of the slot 34 near the end of the leg 30. The end of an extension spring 38 is hooked into the free end of the other leg 32, its other end engages a pin 40 mounted on the base plate 10. The pin 40 is aligned in a line 42 with the two axes 20 and 26. Furthermore, the other leg 32 is coupled to engages a resetting element 46 via a joint 44.

The pin 18 is received by the slot 34 of the reset lever 28, thus forming a joint 48. When the levers 14 and 28 are pivoted, the pin 18 moves in the longitudinal direction within the slot 34.

FIG. 1 shows the control mechanism in one of its two non-neutral positions, wherein the resetting element 46 is located in a position in which the gearbox (not shown) is in a first gear ratio state. If the gearshift lever 24 is pivoted to the right into a central position, then the shaft 12 rotates in counterclockwise direction and pivots the pivot lever 14. The pivoting movement is transmitted by the pin 18 to the reset lever 28, which pivots in clockwise direction simultaneously supported by the spring force of the extension spring 38. This moves the resetting element 46 downward. If the gearshift lever 24 is in its central, neutral channel, the pin 18 lies in the alignment line 42 and the resetting element 46 is found in a central position, which corresponds to the neutral state of the gearbox (not shown).

When the gear shift lever 24 is pivoted further to the right a force is transmitted through the joint 48 to the reset lever 28, which pivots the latter further in the clockwise direction, so that the resetting element 46 moves downward further and brings the gearbox (not shown) into a second gear ratio engagement state.

A gear ratio engagement state is always obtained when the pin 18 is received in the recess 36 of the slot 34 and engages a wall of the recess 36 that faces the second axis 26. The pin 18 and the recess 36 form a detent mechanism which holds the pivot lever 14 and the reset lever 28 in this position despite the effect of the extension spring 38 and possible shocks and the like. Forces applied to the reset lever 28 are not able to release the detent. Only by pivoting the gearshift lever 24 and thereby with it the pivot lever 14, can the detent position be overcome and the control mechanism brought out of the non-neutral position into the neutral position.

If the levers 14 and 28 are configured in such a way that they are oriented at an angle of at least 90 degrees to each other in their non-neutral position, no recesses 36 are required in the slot 34, since in this position the extension spring 38 does not generate any force component that would force the levers 14, 28 into their neutral position. However, this configuration is not shown.

The extension spring 38 has a tension force which is zero or nearly zero in the neutral position and which increases rapidly with increasing excursion of the reset lever 28 from the neutral position. The extension spring 38 exerts a force on the reset lever 28 and the remaining movable components of the control mechanism in order to move them into their neutral position. If the operator applies no force to the gearshift lever 24, then the control mechanism along with the gearbox (not shown) shifts automatically into the neutral position. Since the spring force is very low in the neutral position, the gearshift lever 24 is not impeded from finding its neutral channel. The extension spring 38 is not capable of performing the shift into the neutral position automatically only when the pin 18 is in one of the recesses 36. Preferably, the spring force of the spring element when the gearshift lever 24 is in the neutral position is low or zero, and upon shifting the gearshift lever 24 out of the neutral position the force of the spring element 38 increases rapidly. This allows the remote gearshift lever 24 to find its neutral channel and the lever 24 is not forced by the spring 38 into a non-neutral position.

Figure 2:
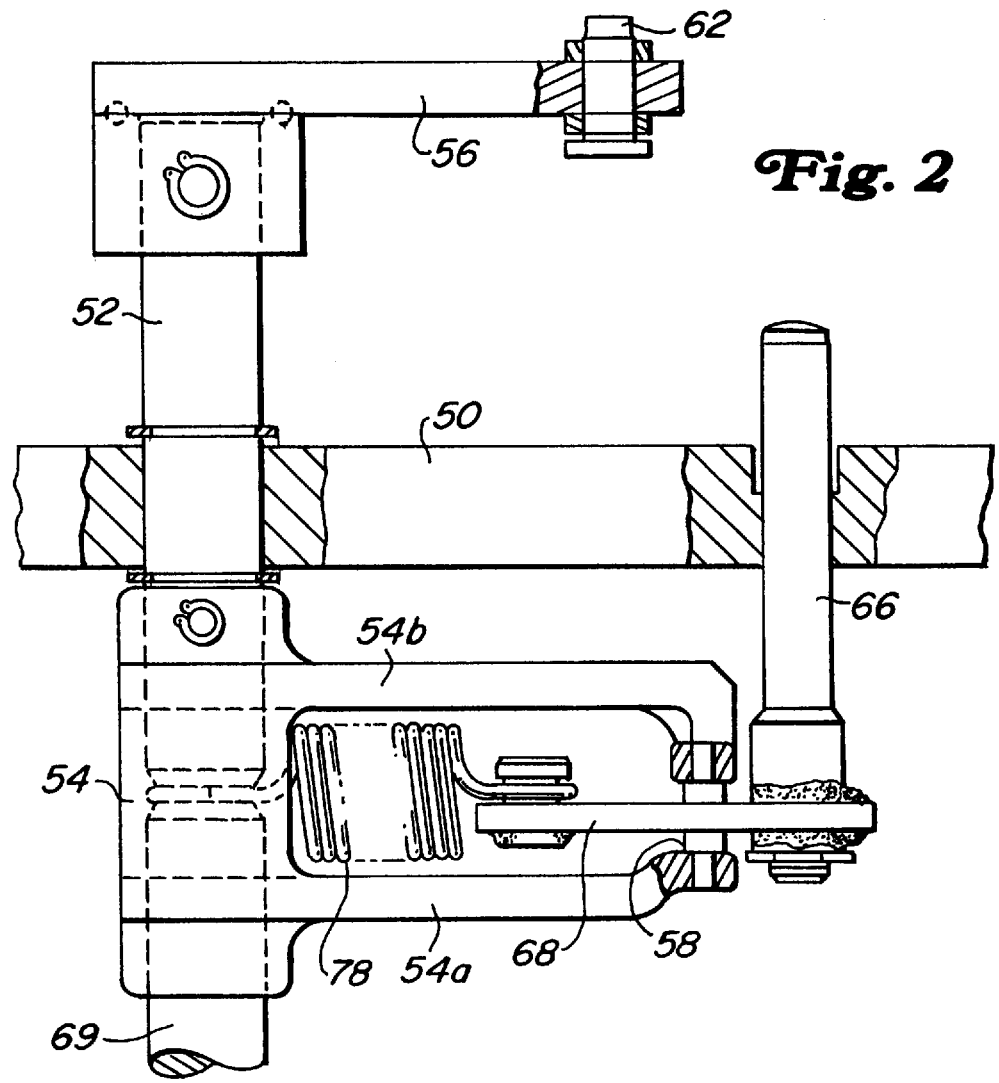
FIG. 2 is a side view of a second control mechanism according to the invention.
Figure 3:
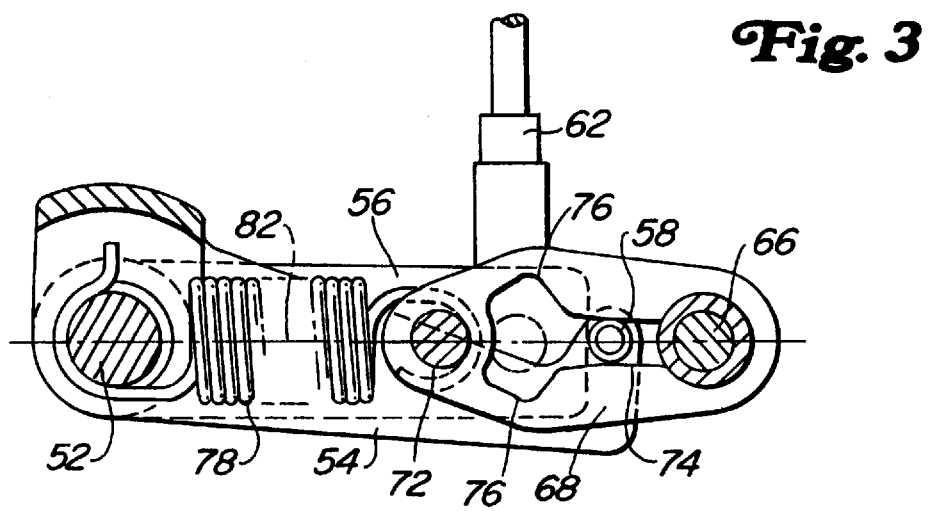
FIG. 3 is a front view of the control mechanism of FIG. 2 in its neutral position.

FIGS. 2 and 3 show a second embodiment of the invention, in which a first shaft 52 is rotatably supported by bearings on a base plate 50. On the lower side of the base plate 50, as seen in FIG. 2, a housing-shaped pivot lever 54 is non-rotatably fixed to the shaft 52. Lever 54 includes two parallel legs 54a and 54b. Between the free ends of the legs 54a and 54b an axle is clamped that is parallel to the shaft 52 and that carries a roller 58, free to rotate, which is crowned or barrel-shaped. On the upper side of the base plate 50 a reset lever 56 is non-rotatably fastened to the shaft 52. Lever 56 has a free end which engages a push-pull control cable 62, which is connected to a gearshift lever (not shown). Also, second shaft 66 is supported for rotation by bearings on the base plate 50. Shaft 66 extends parallel to the first shaft 52 and has a lower end. As best seen in FIG. 2, a plate-shaped reset lever 68 is non-rotatably fastened to the lower end. The second shaft 66 may be connected to a resetting element for a gearbox (not shown).

The reset lever 68 has a slot 74 that extends generally in the longitudinal direction of the lever and that widens to both sides on the side facing away from the shaft 66 to form two recesses 76 at its sides. The longitudinal slot 74 guides the roller 58. The reset lever 68 has a free end which is coupled to one end of an extension spring 78 of a joint 72 is provided that engages one end of an extension spring 78 whose other end is hooked into the first shaft 52.

The control mechanism of FIGS. 2 and 3 is more compact than that of FIG. 1, primarily because the extension spring 78 is hooked between the reset lever 68 and the first shaft 52. Thus, during resetting the components perform only a small relative movement with respect to each other, since the spring rotates in the same direction with the shaft and the pivot lever. Otherwise, the two embodiments operate in a similar manner.

In FIG. 3 the control mechanism is in its neutral position, in which the joint 72 is aligned in a line 82 with the first and the second shafts 52, 66. In this position the extension spring 78 is generally without tension and the roller engages the straight section of the slot 74.

Figure 4:
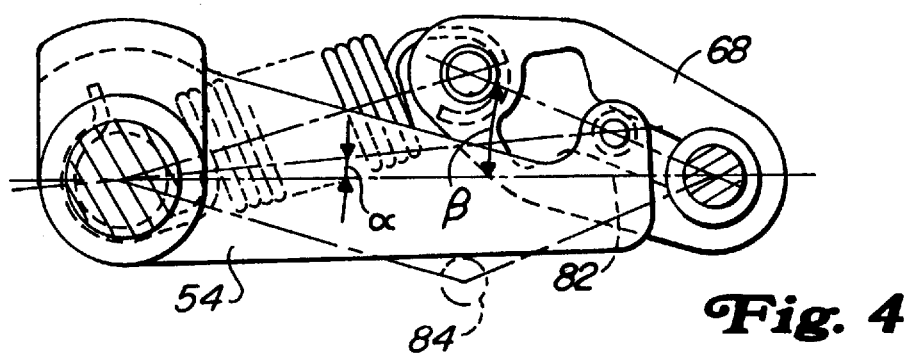
FIGS. 4–6 show three front views of the control mechanism according to FIGS. 2 and 3 in differing positions.
Figure 5:
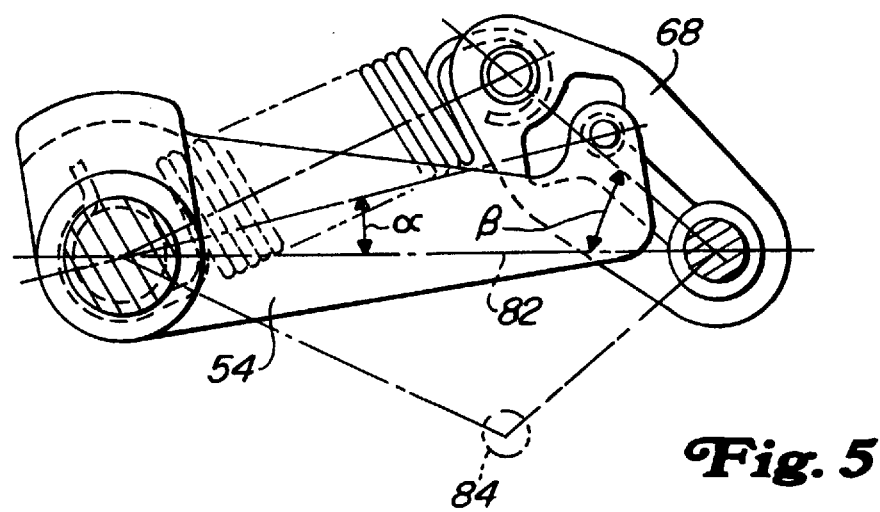
Figure 6:
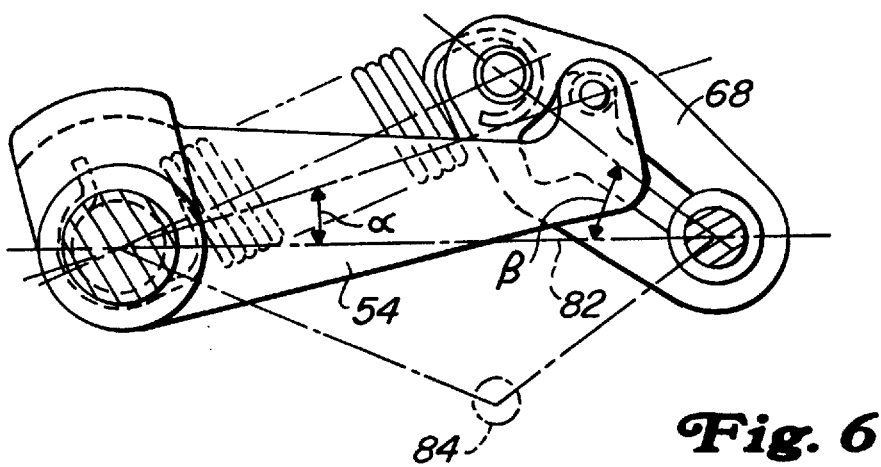

FIGS. 4 through 6 show the control mechanism of FIGS. 2 and 3 in differing positions of excursion from the neutral position. In FIG. 4 the angle of excursion α of the pivot lever 54 in comparison to its neutral position amounts to 5 degrees while the angle of excursion β of the reset lever 68 in comparison to its neutral position amounts to 23 degrees. This represent an unstable intermediate position of the control mechanism which is automatically returned to its neutral position by the tension force of the extension spring 78 (FIG. 3), as long as no forces are applied to the gearshift lever and the first shaft 52.

FIG. 5 shows a further degree of excursion, in which the angle α is 13 degrees and the angle β is 41 degrees. This is the intermediate position from which the control mechanism shifts spontaneously into the locked non-neutral position. The non-neutral position is shown in FIG. 6, wherein α is 17 degrees and β is 39 degrees. A return from the non-neutral position into the neutral position is only possible if the pivot lever 54 is reset.

FIGS. 3 through 6 clearly show a relatively small change in the angle of excursion α of the pivot lever 54 leads to a comparatively large angle of excursion β for the reset lever 68. As a result high manufacturing tolerances are not required of the control mechanism.

The dashed line circle 84 in FIGS. 4 through 6 in each case indicates a virtual position of the joint 72, which is occupied when the levers 54 and 68 are reset downward from their neutral position into a position that is a mirror image of their upper illustrated position. Thereby, the control mechanism is appropriate for a reversing gearbox that can be shifted from a forward gear ratio through a neutral position into a reverse gear ratio.

Figure 7:
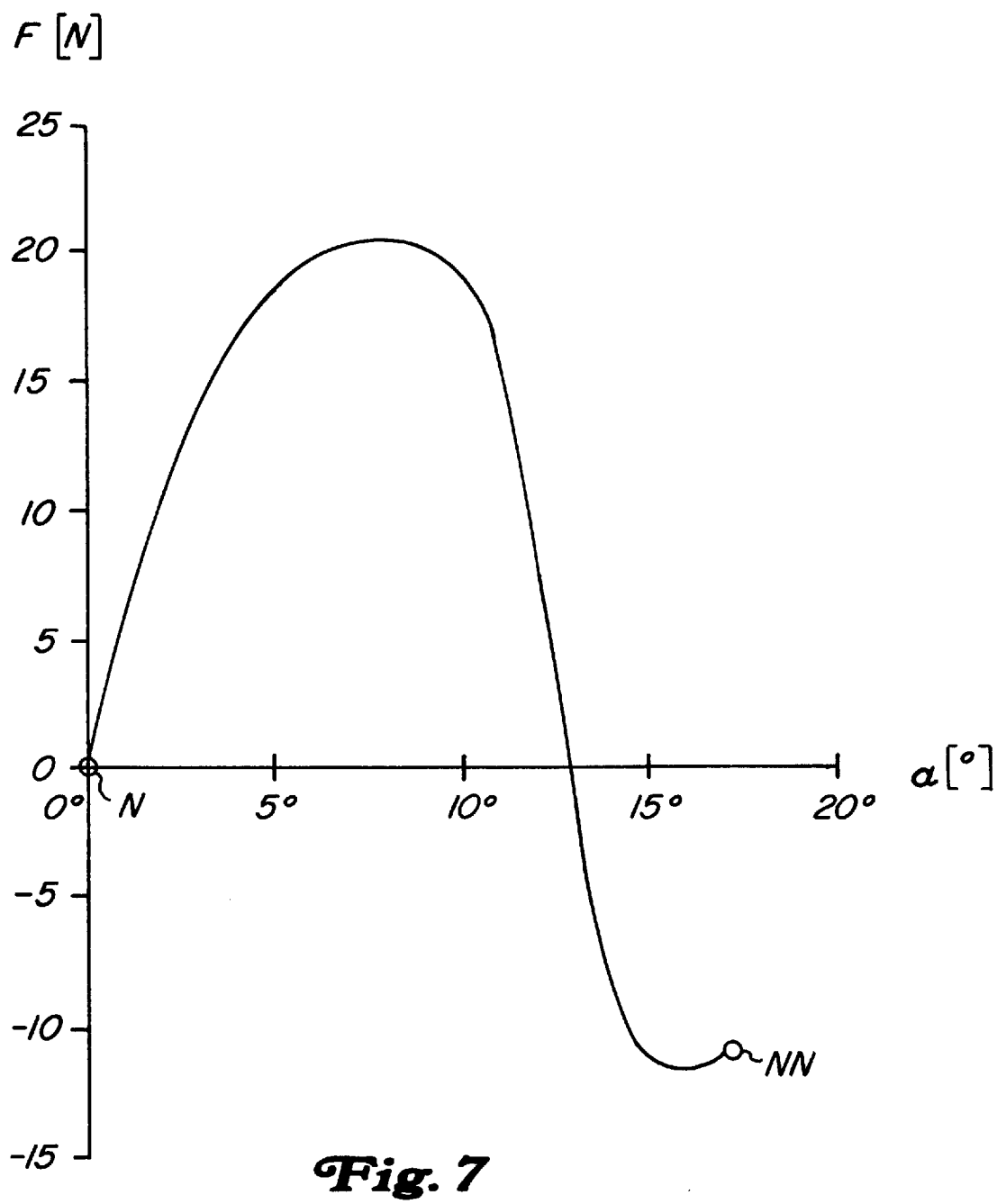
FIG. 7 is a diagram which illustrates the relation between the shift force and the angle of the shift lever.

FIG. 7 shows the relationship between the force F that must be applied to the gearshift lever and the angle of excursion α. This clearly shows that in the neutral position N at an angle of excursion α of zero degrees, the force F is zero. The force F increases with increasing angle of excursion α, reaches its maximum and then drops off very rapidly. A positive force F always forces the control mechanism into its neutral position. At angle α=13 degrees the point of inflection is reached beyond which the force F becomes negative and the roller 58 engages one of the bay-shaped recesses 76 and occupies a stable non-neutral position. Particular emphasis here is placed on the steep drop off of the curve between 12 degrees and 13.5 degrees, which largely avoids a dead center position. The control mechanism described herein is preferably applied to reverse gearboxes for agricultural or industrial utility vehicles, in particular agricultural tractors, with at least one neutral position, one forward position and one reverse position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A control mechanism for coupling to a gearshift lever having a neutral position and at least one non-neutral position, the gearshift lever being adapted for controlling a reversing gearbox having neutral, forward and reverse operational modes, the control mechanism comprising:

a pivot lever coupled to the gearshift lever and pivotable by the gearshift lever about a first shaft aligned with a first stationary axis;

a reset lever pivotable about a second stationary axis which is parallel to the first axis, the pivot and reset levers being pivotally and slidably coupled to each other, the reset lever having a first leg which is coupled to the pivot lever and a second leg;

a gearbox resetting element coupled to one of the pivot and reset levers;

a spring element biased to urge the reset lever into a neutral position from a non-neutral position, and the reset lever being movable out of its neutral positions against the bias of the spring element, the spring element comprising an extension spring having one end coupled to the second leg and having an other end which coupled to a pin, the pin being located on a line on which the first and second axis are located; and detent means for holding the reset lever in its non-neutral positions against the bias of the spring element.

2. The control mechanism of claim 1, wherein:

the reset lever has a slot which extends longitudinally therein; and the pivot lever carries a pin which is received in the slot.

3. The control mechanism of claim 1, wherein:

the pin comprises a crowned roller supported in bearings on a shaft.

4. The control mechanism of claim 1, wherein:

the pivot lever is non-rotatably coupled to the first shaft, the first shaft being rotatably supported by bearings.

5. The control mechanism of claim 1, wherein:

the reset lever is non-rotatably coupled to a second shaft, the second shaft being rotatably supported by bearings for rotation about the second axis, and the reset lever is coupled to the gearbox resetting element.

6. The control mechanism of claim 1, wherein:

the reset lever has a slot which extends longitudinally therein the slot receiving a pin which is attached to the pivot lever.

7. A control mechanism for coupling to a gearshift lever having a neutral position and at least one non-neutral position, the gearshift lever being adapted for controlling a reversing gearbox having neutral, forward and reverse operational modes, the control mechanism comprising:

a pivot lever coupled to the gearshift lever and pivotable by the gearshift lever about a first shaft aligned with a first stationary axis;

a reset lever pivotable about a second stationary axis which is parallel to the first axis, the pivot and reset levers being pivotally and slidably coupled to each other, the reset lever having a first leg which is coupled to the pivot lever and a second leg;

a gearbox resetting element coupled to one of the pivot and reset levers;

a spring element biased to urge the reset lever into a neutral position from a non-neutral position, the spring element comprising an extension spring having one end coupled to the second leg and having an other end which is coupled to the first shaft, and the reset lever being movable out of its neutral positions against the bias of the spring element; and detent means for holding the reset lever in its non-neutral positions against the bias of the spring element.

8. A control mechanism for coupling to a gearshift lever having a neutral position and at least one non-neutral position, the gearshift lever being adapted for controlling a reversing gearbox having neutral, forward and reverse operational modes, the control mechanism comprising:

a pivot lever coupled to the gearshift lever and pivotable by the gearshift lever about a first shaft aligned with a first stationary axis;

a reset lever pivotable about a second stationary axis which is parallel to the first axis, the pivot and reset levers being pivotally and slidably coupled to each other, the reset lever having a slot which extends longitudinally therein;

a pin carried by the pivot lever and which is received in the slot;

a gearbox resetting element coupled to one of the pivot and reset levers;

a spring element biased to urge the reset lever into a neutral position from a non-neutral position, and the reset lever being movable out of its neutral positions against the bias of the spring element; and detent means for holding the reset lever in its non-neutral positions against the bias of the spring element, the detent means comprising a recess formed in the sides of the slot, near an end of slot which is oriented towards the pivot lever.

9. A control mechanism for coupling to a gearshift lever having a neutral position and at least one non-neutral position, the gearshift lever being adapted for controlling a reversing gearbox having neutral, forward and reverse operational modes, the control mechanism comprising:

a pivot lever coupled to the gearshift lever and pivotable by the gearshift lever about a first shaft aligned with a first stationary axis, the pivot lever being non-rotatably coupled to the first shaft, the first shaft being rotatably supported by bearings;

a reset lever pivotable about a second stationary axis which is parallel to the first axis, the pivot and reset levers being pivotally and slidably coupled to each other;

a second lever is non-rotatably coupled to the first shaft, the second lever being coupled to the gearshift lever;

a gearbox resetting element coupled to one of the pivot and reset levers;

a spring element biased to urge the reset lever into a neutral position from a non-neutral position, and the reset lever being movable out of its neutral positions against the bias of the spring element; and detent means for holding the reset lever in its non-neutral positions against the bias of the spring element.

10. The control mechanism of claim 9, wherein:

the second lever is coupled to the gearshift lever (24) via a push-pull cable.

11. A control mechanism for coupling to a gearshift lever having a neutral position and at least one non-neutral position, the gearshift lever being adapted for controlling a reversing gearbox having neutral, forward and reverse operational modes, the control mechanism comprising:

a pivot lever coupled to the gearshift lever and pivotable by the gearshift lever about a first shaft aligned with a first stationary axis, the pivot lever having two legs which are parallel to each other, the legs having free ends which are coupled together by a pin;

a reset lever pivotable about a second stationary axis which is parallel to the first axis, the pivot and reset levers being pivotally and slidably coupled to each other, the reset lever having a slot which extends in a longitudinal direction therein, the pin being received by said slot;

a gearbox resetting element coupled to one of the pivot and reset levers;

a spring element biased to urge the reset lever into a neutral position from a non-neutral position, and the reset lever being movable out of its neutral positions against the bias of the spring element; and detent means for holding the reset lever in its non-neutral positions against the bias of the spring element.

12. The control mechanism of claim 11, wherein:

the spring element comprises an extension spring having a first end coupled to the reset lever and a second end coupled to the first shaft which carries the pivot lever, and the extension spring is positioned between the two legs of the pivot lever.

* * * * *